(12) United States Patent
Praszczalek et al.

(10) Patent No.: US 10,848,496 B2
(45) Date of Patent: Nov. 24, 2020

(54) SYSTEM AND METHOD FOR SECURE INDIVIDUAL IDENTIFICATION ACROSS MULTIPLE DISPARATE ENTITIES

(71) Applicant: MASTERCARD INTERNATIONAL INCORPORATED, Purchase, NY (US)

(72) Inventors: Przemek Praszczalek, Irvington, NY (US); Pat McBennett, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 223 days.

(21) Appl. No.: 16/159,318

(22) Filed: Oct. 12, 2018

(65) Prior Publication Data

US 2019/0116188 A1 Apr. 18, 2019

Related U.S. Application Data

(60) Provisional application No. 62/571,666, filed on Oct. 12, 2017.

(51) Int. Cl.
| | |
|---|---|
| *H04L 29/06* | (2006.01) |
| *G06Q 30/02* | (2012.01) |
| *G06Q 10/06* | (2012.01) |
| *G06F 16/182* | (2019.01) |
| *G06F 16/903* | (2019.01) |
| *H04L 29/08* | (2006.01) |

(52) U.S. Cl.
CPC .......... *H04L 63/102* (2013.01); *G06F 16/182* (2019.01); *G06F 16/90335* (2019.01); *G06Q 10/063118* (2013.01); *G06Q 30/0256* (2013.01); *H04L 63/0884* (2013.01); *H04L 67/306* (2013.01)

(58) Field of Classification Search
CPC .......... H04L 63/102; H04L 63/0884
USPC .......... 726/4
See application file for complete search history.

(56) References Cited

U.S. PATENT DOCUMENTS

| 10,250,672 B2 * | 4/2019 | Cheah .......... H04L 61/1535 |
| 2008/0243770 A1 | 10/2008 | Aasman |
| 2016/0019250 A1 * | 1/2016 | Kumar .......... G06F 16/2291 |
| | | 707/740 |

OTHER PUBLICATIONS

International Search Report and Written Opinion for Application No. PCT/US2018/055587 dated Dec. 19, 2018 (12 pages).

(Continued)

*Primary Examiner* — Longbit Chai
(74) *Attorney, Agent, or Firm* — Michael Best & Friedrich LLP

(57) ABSTRACT

An entity communicates with a central authority to issue an asset to an individual. The asset has associated therewith a distinct URI or "unique ID". The asset uniquely identifies the individual to the issuing entity and to other entities in communication with the central authority. Select data about the individual obtained by one or more entities is stored in the central authority or in a network memory in communication therewith using the Resource Description Framework, which allows for this data to be queried by the entities with increased efficiency.

20 Claims, 5 Drawing Sheets

(56) References Cited

OTHER PUBLICATIONS

Hogan et al., "Title Performing Object Consolidation on the Semantic Web Data Graph Publication Information Performing Object Consolidation on the Semantic Web Data Graph," Proceedings of I3: Identity, Identifiers, Identification, in conjunction with 16th International World Wide Web Conference, Jan. 1, 2007. Retrieved from the Internet <https://aran.library.nuigalway.ie/bitstream/handle/10379/493/paper.pdf?sequence=1>.

Heitmann et al., "An architecture for privacy-enabled user profile portability on the web of data," Proceedings of the 1st International Workshop on Information Heterogeneity and Fusion in Recommender Systems, 2010, pp. 16-23.

Wikipedia, "Blockchain," Jun. 13, 2017 <https://en.wikipedia.org/w/index.php?title=Blockchain&oldid=785374674> Retrieved from the Internet on Sep. 21, 2017.

* cited by examiner

PROFILE 200

Core record 202

| Unique ID | First Name + Last Name | Address | DOB | Gender | Country of Origin | Marital Status | Spouse + Dependents | Consent |
|---|---|---|---|---|---|---|---|---|
| | | | | | | | | |

Extended record 204

| Income/Assets | Vulnerability | Health Status | Medical Needs | Protection Needs | Type of Displacement | Mobile Phone No. | Other ID Documents | Payment Account Info. |
|---|---|---|---|---|---|---|---|---|
| | | | | | | | | |

FIG. 2

SYSTEM AND METHOD FOR SECURE INDIVIDUAL IDENTIFICATION ACROSS MULTIPLE DISPARATE ENTITIES

CROSS-REFERENCE TO RELATED APPLICATION

This application claims the benefit of U.S. Provisional Application No. 62/571,666, filed on Oct. 12, 2017, the entire content of which is hereby incorporated by reference.

BACKGROUND

An entity-specific identification vehicle (or other form factor) issued to an individual by an entity uniquely identifies the individual to that entity. Because the identification vehicle is entity-specific, the individual is unable to utilize that identification vehicle to verify his or her identity at entities disparate from the issuing entity. The individual is left to obtain an entity-specific identification vehicle for identifying the individual to the entity from each entity, which results in a duplication of efforts by the entities, gives rise to potential for fraud, and unduly delays attainment of benefits by the individual.

SUMMARY

An entity communicates with a central authority to issue an asset to an individual. The asset has associated therewith a distinct string or "unique ID", e.g., a "WebID" or a DID (decentralized identifier). The asset uniquely identifies the individual to the issuing entity and to other entities in communication with the central authority. Select individual data obtained by one or more entities is stored in the central authority or in a network memory in communication therewith using a Resource Description Framework (RDF), which allows for this data to be queried by the entities with increased efficiency over systems in the prior art. Specifically, the increased efficiency is in an individual's faster identity-related interaction (for example, an identity verification, a receipt of a benefit, or other suitable identity-related interaction) with other disparate entities in communication with the central authority after registering with a first entity device and obtaining the asset.

Additionally, in some examples, another improvement over systems in the prior art is in an individual's ability to provide and revoke consent to the select individual data that is stored in the central authority using the RDF. Further, in other examples, yet another improvement over systems in the prior art is a benefactor's ability to glean information from the central authority about the use of the benefactor's contributions.

One embodiment of the present disclosure includes a server. The server includes a network interface that communicates with a network, a memory including a resource description framework (RDF) database, and an electronic processor electrically connected to the memory. The electronic processor is configured to receive a profile of an individual from a first entity device of a plurality of entity devices via the network, wherein each entity device of the plurality of entity devices corresponds to one entity from a plurality of disparate entities, generate a unique identifier for the individual in response to receiving the profile of the individual, store the profile of the individual and the unique identifier for the individual in the RDF database, and controlling the network interface to communicate the unique identifier to one or more of the plurality of entity devices.

Another embodiment of the present disclosure includes a system. The system includes a plurality of entity devices and a server. Each entity device of the plurality of entity devices corresponding to one entity from a plurality of disparate entities. Each entity device of the plurality of entity devices also including an entity database. A first entity device of the plurality of entity devices is configured to obtain information from an individual, generate a profile based on the information from the individual, store the profile in the entity database of the first entity device, and output the profile to a network. The server includes a network interface that communicates with the network, a memory including a resource description framework (RDF) database, and an electronic processor electrically connected to the memory. The electronic processor configured to receive the profile from the first entity device, generate a unique identifier for the individual in response to receiving the profile of the individual, store the profile of the individual and the unique identifier for the individual in the RDF database, and control the network interface to communicate the unique identifier to one or more of the plurality of entity devices via the network.

Yet another embodiment of the present disclosure includes a non-transitory computer-readable medium. The non-transitory computer-readable medium includes instructions that, when executed by an electronic processor, causes the electronic processor to perform a set of operations. The set of operations includes receiving a profile of an individual from a first entity device of a plurality of entity devices, wherein each entity device of the plurality of entity devices corresponds to one entity from a plurality of disparate entities, generating a unique identifier for the individual in response to receiving the profile of the individual, storing the profile of the individual and the unique identifier for the individual in a RDF database, and controlling a network interface to communicate the unique identifier to one or more of the plurality of entity devices.

BRIEF DESCRIPTION OF THE FIGURES

FIG. 2 shows an example profile of the individual of FIG. 1.

DETAILED DESCRIPTION OF THE EMBODIMENTS

Figure 1:
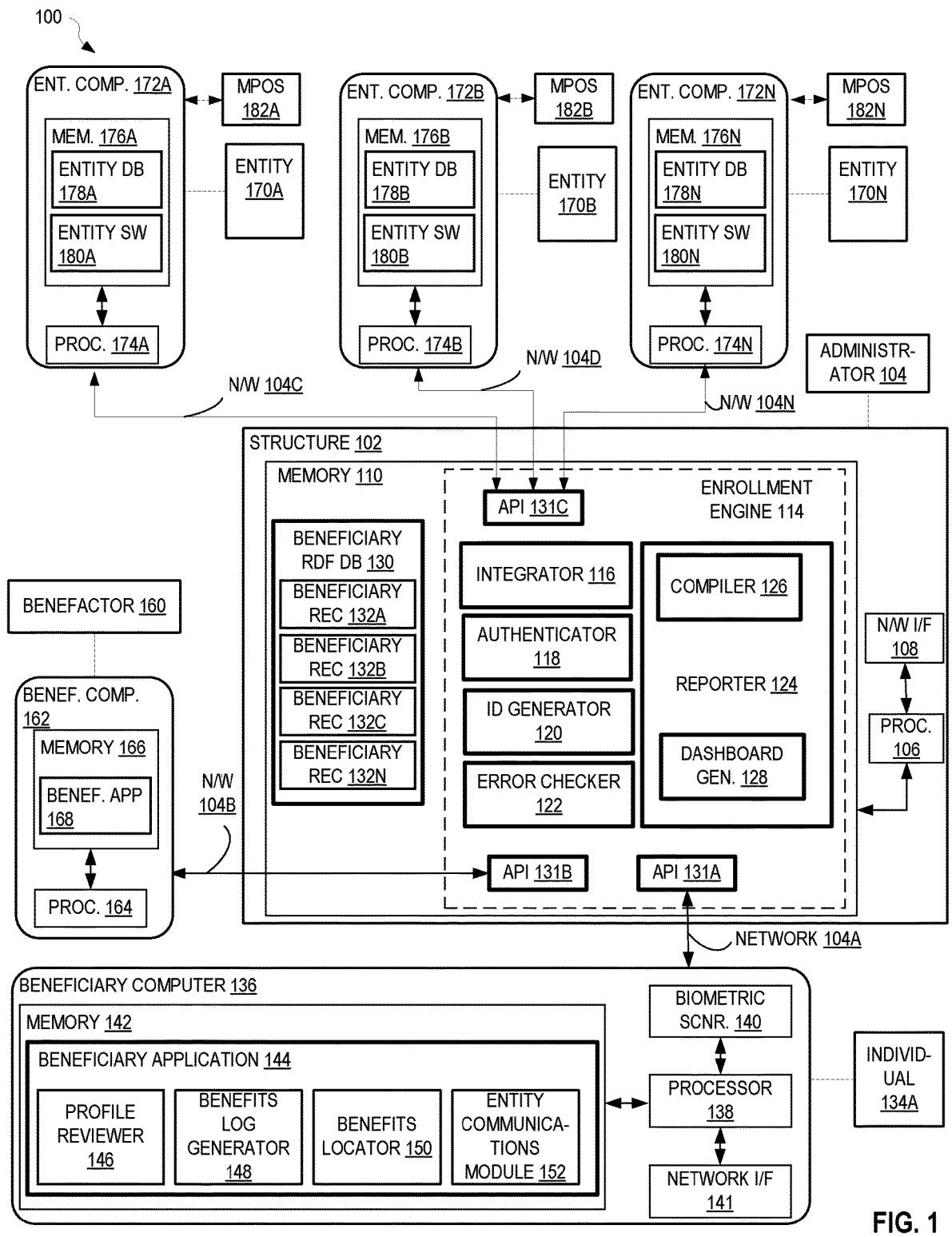
FIG. 1 shows one example system for securely identifying an individual across multiple disparate entities.

FIG. 1 shows an example system 100 for securely identifying an individual across multiple disparate entities through an online structure 102. The structure 102 may be owned by, or operated by or on behalf of, an administrator 104.

Online structure 102 (also referred to as a "server") may be implemented by one or more networked computer servers, and is shown with a processor 106 communicatively coupled to a network interface 108 and a memory 110. Processor 106 represents one or more digital processors. Network interface 108 may be implemented as one or both of a wired network interface and a wireless network interface, as is known in the art. Memory 110 represents one or more of volatile memory (e.g., RAM) and non-volatile memory (e.g., ROM, FLASH, magnetic media, optical media, et cetera). In some examples, the memory 110 is also a non-transitory computer-readable medium. Although shown within online structure 102, memory 110 may be, at least in part, implemented as network storage that is external to structure 102 and accessed via network interface 108. For example, all or part of memory 110 may be housed on the "cloud."

Enrollment engine 114 may be stored within a transitory or non-transitory portion of the memory 110. Enrollment engine 114 includes machine readable instructions that are executed by processor 106 to perform the functionality of structure 102 as described herein. In the illustrated embodiment, the enrollment engine 114 includes an integrator 116, an authenticator 118, an ID generator 120, an error checker 122, and a reporter 124. The reporter 124 may include a compiler 126 and a dashboard generator 128.

The memory 110 may include a beneficiary database or other container 130 for storing information about individuals. The database 130 may be an RDF database, i.e., employ the Resource Description Framework, as set forth in more detail herein. Alternatively, the database 130 may be another suitable database with features similar to the features of the Resource Description Framework. The beneficiary RDF database 130 may include a plurality of records, e.g., records 132A, 132B, 132C, and 132N. Each record may be associated with and contain personal information about one individual. For example, in the illustrated embodiment, record 132A may be associated with an individual 134A, and each of records 132B, 132C, and 132N may be respectively associated with one of N other individuals (not expressly shown in FIG. 1).

The Resource Description Framework may allow one (e.g., the administrator 104, an entity, etc.) to navigate through the personal information in the records 132A-132N as if browsing the World Wide Web. The Resource Description Framework is a family of World Wide Web Consortium (W3C) specifications that allow for seamless integration of data from multiple disparate sources and schemes (e.g., integration of data about the individual 134A obtained from multiple entities). The Resource Description Framework may be used to associate properties with a "resource" in the form of a "triple." The resource may be any object that is uniquely identifiable by a Uniform Resource Identifier (URI), and the triple may contain a statement about the resource in the form of a "subject-predicate-object" expression. Each of the subject and the predicate may have a URI associated therewith, and the object may be a URI or a constant (e.g., a string of numbers, text, etc.). In the triple expression (or triple), the subject may denote the resource, the predicate may denote a trait or an aspect of the subject by outlining a relationship between the subject and the object, and the object may denote a target or value of the triple.

Assume, for example, that the resource or subject is a person (e.g., individual 134A), and that multiple disparate triples are used to identify different aspects of the individual 134A (e.g., one triple having the individual 134A as the subject is used to denote that the age of the individual 134A is 30 years, another triple having the individual 134A as the subject is used to denote that the individual 134A is married, yet another triple having the individual 134A as the subject is used to denote that the individual 134A has three children, etc.). The Resource Description Framework may allow for these disparate triples to be, in effect, connected to each other by virtue of their common subject (here, the individual 134A). Additional information about the individual 134A may thus be readily incorporated in the structure 102 by associating additional links with the URI that identifies the individual 134A. Because of this unique triple (or triad) framework, interconnected information about the individual 134A obtained from disparate sources (e.g., disparate entities) may be queried with increased speed (as compared to using traditional relational databases, for example).

The structure 102 may be in data communication with a beneficiary computer 136. The beneficiary computer 136 may be web-compatible mobile computer, such as an Apple laptop, an Android tablet, a Google smart phone, etc. Alternately, or in addition, the beneficiary computer 136 may be a desktop computer. The beneficiary computer 136 includes a processor 138 in communication with memory 142. In an embodiment, the processor 138 is also in communication with a biometric scanner 140 and a network interface 141. The processor 138 represents one or more digital processors, the memory 142 represents one or more of volatile memory and non-volatile memory, and the biometric scanner 140 represents one or more biometric scanning devices (e.g., a device that scans fingerprints, facial features, handwriting, et cetera) now known or subsequently developed. The network interface 141 may be a wireless or wired network interface.

Beneficiary application 144, which contains software instructions implemented by the processor 138 to perform the functions of the beneficiary computer 136 as described herein, is stored within a transitory or a non-transitory portion of the memory 142. The individual 134A downloads the beneficiary application 144 onto the beneficiary computer 136 to enable computer 136 to communicate with the structure 102. Alternately or in addition, the beneficiary application 144 may be a web application (hosted on a secure and password protected website, for example) accessible by the individual 134A via an internet browser or the like. The beneficiary application 144 may have a graphical user interface that facilitates interaction between the individual 134A and the structure 102.

The beneficiary computer 136 may communicate with the structure 102 over network 104A. The network 104A is preferably (but not necessarily) a wireless network, such as a wireless personal area network, local area network, and so on. The structure 102 may include an Application Programming Interface (API) 131A that allows the individual 134A to communicate with the structure 102 via the beneficiary computer 136.

In an embodiment, the beneficiary application 144 may include a profile viewer 146, a benefits log generator 148, a benefits locator 150, and an entity communications module 152, each of which are described in more detail herein. While FIG. 1 shows one individual 134A communicating with the structure 102 via the beneficiary computer 136, those skilled in the art will readily understand from the disclosure herein that numerous (e.g., hundreds of thousands of) individuals may likewise communicate with the structure 102 via their respective mobile (or other) computers.

The structure 102 may include an API 131B to allow a benefactor 160 to communicate with the structure 102 via a benefactor computer 162. The benefactor computer 162 may be web-compatible mobile or other computer having a processor 164 in data communication with a memory 166. The processor 164 represents one or more digital processors and the memory 166 represents one or more of volatile memory and non-volatile memory. Benefactor application 168 may be stored in a transitory or a non-transitory portion of the memory 166 and may allow the benefactor 160 to communicate with the structure 102 over network 104B. Alternately or in addition, the benefactor application 168 may be a web application accessible by the individual 134A via an internet browser. The network 104B is preferably (but not necessarily) a wireless network, such as a wireless personal area network, local area network, and so on. While FIG. 1 shows one benefactor 160 communicating with the structure 102 via the benefactor computer 162, those skilled in the art will appreciate that numerous benefactors may likewise communicate with the structure 102 via their respective benefactor computers.

Entity 170A (also referred to as an "entity device") may communicate with structure 102 over network 104C via entity computer 172A. Entity computer 172A may be a web-accessible mobile computer (e.g., a laptop, tablet, smart phone, etc.). Alternately or additionally, the entity computer 172A may be a desktop or other stationary computer. The entity computer 172A may have a processor 174A in data communication with memory 176A. Processor 174A represents one or more digital processors and memory 176A represents one or more of volatile memory and non-volatile memory (including memory remote from entity computer 172A and accessible thereby over a network). The network 104C may be a wired and/or wireless network.

In an embodiment, memory 176A may include entity database 178A and entity software 180A. Entity database 178A may include information about individual 134A and other individuals, as set forth herein. The entity software 180A may facilitate interaction between entity 170A and individuals (e.g., individual 134A) and allow for the entity to track said interactions. For example, the entity software 180A may allow the entity 170A to endow individual 134A with a benefit if the individual 134A meets the requisite criteria for receiving this benefit. In other examples, the entity 170A may track other identity-related interactions with the individual 134A besides the benefit. As described herein, the benefit provided to the individual 134A is one example of an identity-related interaction.

The entity computer 172A may include or be in communication with a point of sale system (POS), e.g., a mobile POS system 182A (such as a mobile card reader). As discussed herein, the entity 170A may use the mobile POS system to, among other things, read an asset associated with the individual 134A to verify the identity of the individual 134A.

The structure 102 may likewise communicate with entities other than the entity 170A. For example, as shown in FIG. 1, entities 170B and 170N (collectively entities 170A, 170B, and 170N are also referred to as a "plurality of entity devices") may respectively communicate with the structure 102 over networks 104D and 104N via entity computers 172B and 172N. Entity computers 172B and 172N (including processors 174B and 174N, memories 176B and 176N, entity databases 178B and 178N, entity software 180B and 180N) may be functionally similar to entity computer 172A; however, the data in the entity databases 178A, 178B, and 178N may be disparate. For example, entity database 178A may contain information about ten attributes (e.g., age, gender, ethnicity, marital status, nationality, country of origin, etc.) of an individual and entity database 178B may contain information about twenty attributes of that individual. Or, for instance, each of entity database 178A and 178B may contain information about ten attributes of an individual, only five of which attributes are common. Thus, those skilled in the art will understand that each entity database 178A, 178B, and 178N may contain different information about an individual, and that this information may be maintained by the different entities in different formats, schemes, etc. The structure 102 may allow at least some of this information about an individual (e.g., individual 134A) to be standardized so that one entity (e.g., 170A) may benefit from information stored about the individual by another entity (e.g., entity 170B).

Many countries and regions in the world are in a state of crisis. Because of these crises, there are over sixty-five million persons that are displaced globally, and several million additional persons are displaced every year. For example, according to some estimates, about 8.3 million people were displaced in 2016. Many of these displaced persons are in dire need of assistance (e.g., require financial assistance, healthcare, meals, potable water, transportation, fertilizers for crops, education, etc.). At least in the U.S., much of this assistance is provided by non-governmental organizations (NGOs) and other such charitable institutions. Specifically, benefactors (e.g., wealthy individuals, philanthropic organizations, federal or state governmental institutions, for-profit corporations, etc.) may make donations or grants (e.g., of money, labor, time, or the like) to an NGO or other charitable institution (collectively, NGO), and the NGO may use same to provide assistance to the displaced persons.

A displaced person may be required to obtain assistance from several different NGOs (e.g., the displaced person may obtain monies from two NGOs, may obtain prescription medication from a third NGO, and may obtain food supplies from a fourth NGO). Each NGO may have its own computing system which the NGO uses to store information about the displaced persons it assists. In the prior art, the NGOs are not in data communication with each other; each NGO registers each displaced person separately, and each NGO furnishes to each displaced person it assists an identification vehicle (i.e., an identification card such as a points card) that uniquely identifies the displaced person to that NGO. The displaced person may thus have to use one identification card to obtain a benefit from one NGO and another identification card to obtain a benefit from another NGO, which may be undesirable. This is particularly so because 30-50 million man hours are wasted by the NGOs to register displaced persons that are already registered by at least one NGO. Moreover, registration of a person that is already registered at a first NGO at a second NGO is a time consuming process that unduly prolongs the time it takes for the second NGO to provide the person with the needed assistance. Because each NGO conducts the registration process independently, a typical displaced household is, on average, registered between five and fifteen times by the various NGOs. Such re-registrations needlessly tie up NGO resources and unduly delay the provision of assistance to the individuals. Moreover, because each NGO may store data about the displaced persons using different schemes, compiling the data about the millions of displaced persons from the many hundreds of NGOs using conventional means is unfeasible. The structure 102 may employ the RDF framework to more conveniently integrate this data at a central location in data communication with the various NGOs. The structure 102 may further allow for one NGO to issue a displaced person an asset that uniquely identifies that displaced person to that NGO and also to other NGOs in data communication with the structure 102.

The term "entity", as used herein, encompasses non-governmental organizations and other charitable institutions (including governmental organizations) that provide assistance to displaced persons. For example, entity 170A may be "Save the Children", entity 170B may be "Oxfam", entity 170N may be the "Department for International Development", etc. The term "disparate entities", as used herein, encompasses non-governmental organizations and other charitable institutions (including governmental organizations) that are separate from each other, and at best, indirectly communicate with each other. For example, entity 170A is separate and distinct from entity 170B and entity 170N. Similarly, entity 170B is separate and distinct from entity 170A and entity 170N. In some examples, entity 170A may have a first national origin, entity 170B may have a second national origin that is different from the first national origin, and entity 170N may have a third national origin that is different from the first national origin and the second national origin. Further, while entities 170A, 170B, and 170N encompass non-governmental organizations and other charitable institutions (including governmental organizations), entities 170A, 170B, and 170N cannot be part of a common larger entity and directly communicate with each other via the common larger entity.

The term "individual", as used herein, denotes a person (or household) that seeks assistance from two or more entities (e.g., a refugee in a refugee camp, a person who receives urban aid, etc.). The term "benefactor", as used herein, refers to an individual, group, organization, corporation, etc. that makes a grant to one or more entities.

The workings of the structure 102 will now be described in additional detail with an example. Assume that individual (or "beneficiary") 134A wishes to obtain assistance from each of the entities 170A, 170B, and 170N. Assume further that the individual 134A is not registered with any of the entities 170A, 170B, and 170N. As discussed, in the prior art, the individual 134A may have to separately register with each entity 170A, 170B, and 170N. The system 100, conversely, may allow individual 134A to obtain assistance from entities 170B and 170N without having to undergo the registration process at each of these entities.

The individual 134A may initially visit entity 170A (e.g., an aid distribution center or another location associated with the entity 170A). The entity 170A may create a unique profile 200 for the individual 134A (FIG. 2). The example profile 200 may include a core record 202 and an extended record 204. The core record 202 may include basic information about the individual 134A, such as his name, address, date of birth, country of origin, marital status, information about his spouse and dependents, etc. The core record 202 may also indicate whether the individual 134A has consented to share the information he provides to entity 170A with other entities. Meaningful consent management and extensive permissions will support the individual with access and ability to manage his or her own data shared with participating entities, including but not limited to: data and attributes storage, access management rights, pathway to withdrawal of consent, and an overview of which entities have access to and manage information about the individuals. In some examples, the entity 170A may use the structure 102 with the Resource Description Framework to track and manage the providence of consent provided by an individual that interacts with the entity 170A over time. For example, the entity 170A may use the structure 102, which is a social linked database (referred to as "SOLID") server, to track and manage the providence of the consent of the individual 134A over time while also giving the individual 134A a read and write capability of data stored on the SOLID server. Consequently, the individual 134A has complete ownership of the data associated with the individual 134A and stored on the SOLID server. Additionally, in some examples, the structure 102 actively manages consent by collecting, storing, and managing data elements; tracking to whom consent has been given and to which data elements, and for how long; tracking who has requested access to the data elements; and sharing data elements to various individuals that have the correct credentials.

The extended record 204 may include other (e.g., ancillary) information about the individual 134A. For example, the extended record 204 may include information about the income, vulnerabilities, health status, medical needs, protection needs, displacement type, phone number, etc. of the individual 134A. The extended record 204 may also include copies of documents that identify the individual 134A and information regarding accounts usable to pay monies to the individual 134A.

In an embodiment, a "unique ID", such as a WebID or a DID (decentralized identifier), may be assigned to the individual 134A (e.g., "https://mastercard.com/id/42141241#me", or another URI may be assigned to the individual 134A). The unique ID may uniquely identify the individual 134A to the entity 170A (and other entities). In the prior art, the entity-specific identification card may contain a number that identifies the individual to the entity 170A. Because the identification number is a fixed string, associating additional information about the individual 134A with that fixed string is unviable. The unique ID, conversely, because of its URI format, may allow for additional information about the individual 134A to be easily associated with the individual 134A by using additional links. The unique ID may be stored in the core record 202 of the profile 200.

In an embodiment, the unique ID may be generated by the ID generator 120 of the enrollment engine 114. Specifically, the entity 170A may obtain certain information (e.g., first name, last name, gender, income, etc.) from the individual and plug these into the core record 202 and the extended record 204 of the profile 200 as appropriate. The entity 170A may then communicate this partial profile to the structure 102. The structure 102, i.e., the ID generator 120 of the enrollment engine 114 thereof, may generate a unique ID for the individual and transmit same to entity 170A. For example, the ID generator 120 may generate a random GUID (globally unique identifier) or version 4 UUID string and attach same to the core URI associated with the naming convention used by the structure 102. In embodiments, all or part of the profile 200 may be stored in the beneficiary database 130 in the structure 102 (e.g., the profile 200 may be pushed to the cloud and stored thereon).

The entity 170A may store the unique ID generated by the ID generator 120 (together, in embodiments, with the profile 200 associated with the individual 134A) in the entity database 178A. In this way, the unique ID generated by the ID generator 120 may be associated with the profile of the individual 134A in the entity database 178A.

Figure 3:
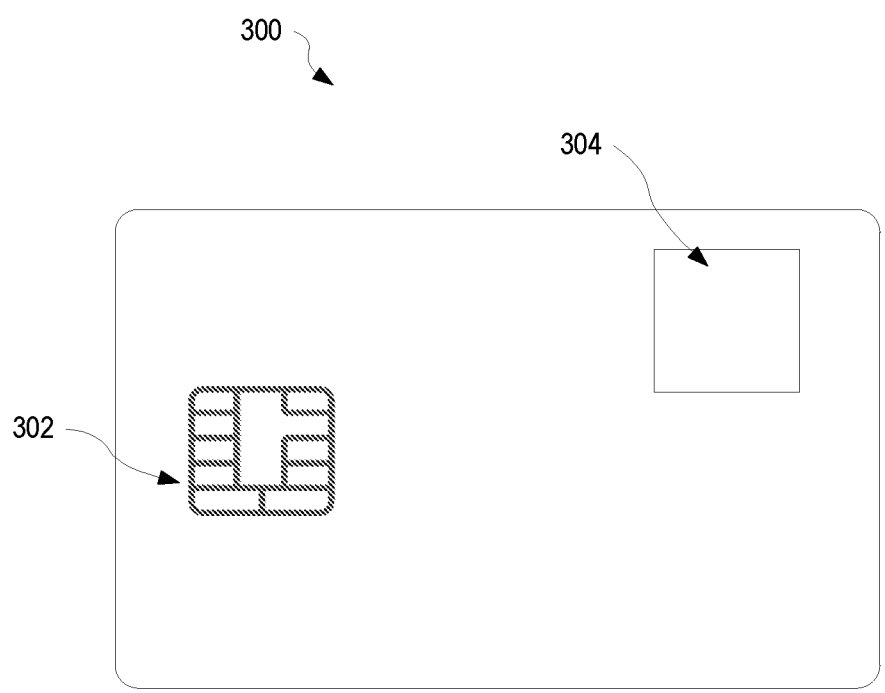
FIG. 3 shows an example asset issued to the individual of FIG. 1 by an entity.

In embodiments, the entity 170A may also use the mobile POS 182A to issue an asset 300 (FIG. 3) to the individual 134A. The asset 300 may be, for example, an identification card that uniquely identifies the individual 134A. Alternately or in addition, the asset 300 may be a digital asset or the like that is stored on the beneficiary computer 136 or another electronic device issued to the individual 134A. The unique ID of the individual 134A may be stored on or otherwise associated with the asset 300. In embodiments, assuming the individual 134A consents to sharing this information, the entire core record 202 (and in some embodiments, all or part of the extended record 204) of the individual 134A may be stored onto the asset 300. Because this information is stored directly on the asset 300, it may be available offline (e.g., the information may be retrieved by an entity even when that entity is not in data communication with the structure 102). In other words, the entity 170A may register and write the data onto the asset 300 (the data including an ID lifecycle status) in an offline environment (and also local storage, for example, an Android tablet for later synchronization to the cloud). In this way, the asset 300 may continue to be used as multiple identity profiles with an ID lifecycle status marked as one of "active," "suspended," or "deleted" for the individual 134A.

The asset 300 may be secured by biometric data 302 of the individual 134A (e.g., a thumbprint, retinal scan, etc.) and/or a pin-enabled or other EMV chip 304. While not required, in some embodiments, the asset 300 may also be usable as a financial instrument (e.g., as a debit or points card). As discussed herein, the asset 300 may be interoperable across the entities 170A, 170B, and 170N. That is, multiple entities in communication with the structure 102 may be able to use their respective mobile POS systems and the asset 300 to verify the identity of the individual 134A.

Once the asset 300 is issued to the individual by the issuing entity (here, entity 170A), the entity 170A may use the entity software 180A to determine the benefits owed to the individual 134A (e.g., the entity 170A may issue to the individual 134A an electronic voucher or the like usable to obtain the benefits). When the benefits have been disbursed, the profile of the individual 134A may be updated as required, and the updated profile may be communicated to the structure 102 so that the beneficiary record 132A on the cloud may be updated as needed.

Assume now that the individual 134A visits entity 170B. In the prior art, if individual 134A was not previously registered at the entity 170B, the entity 170B would have to separately register the individual 134A with the entity 170B. In an embodiment of the present disclosure, conversely, such re-registration by subsequent entities may be avoided. Specifically, the entity 170B may use the mobile POS system 182B to read the asset 300 to authenticate the individual 134A (e.g., via the pin, biometric data, or other means). While not required, in embodiments, the authenticator 118 may ensure that the asset 300 is being presented to the entity 170B by the individual to whom the asset 300 was issued (e.g., the authenticator 118 may verify that the pin provided by the individual 134A to the entity 170B matches the pin associated with the asset 300). Alternately, the entity 170B may authenticate the individual 134A without communicating with the structure 102 (e.g., the entity 170B may have a biometric scanner and the entity 170B may authenticate the individual 134A by ensuring that the biometric data being provided by the individual 134A to the entity 170B matches the biometric data on the asset 300).

Once the identity of the individual 134A is verified at entity 170B, the mobile POS system 182B may read the core record 202 of the individual 134A stored on the asset 300 and communicate same to the entity 170B. The entity computer 172B may now confirm, using e.g., the entity database 178B and the entity software 180B that the individual 134A is entitled to a benefit. If so, the entity 170B may disburse this benefit to the individual 134A (in the form of an electronic voucher, for example). The profile 200 of the individual 134A may be updated to reflect the provision of benefits to the individual 134A by the entity 170B if desired, and the updated profile 200 may be communicated to the structure 102 to be stored in the beneficiary record 132A. The process may be repeated with the entity 170N. In this way, thus, the system 100 may allow for the identity of the individual 134A to be readily verified at multiple entities without the need to independently register the individual 134A at each entity.

Additionally, in some examples, every provision of a benefit is recorded in the structure 102 using a secure distributed ledger technology (for example, a Blockchain) in which benefits are recorded chronologically and secured for access by the benefactor 160. In this way, the benefactor 160 maintains visibility of the benefits being provisioned by the entities 172A-172N via the structure 102 and the secure distributed ledger technology.

The information associated with an individual (e.g., individual 134A) may change from time to time. For example, the individual 134A may have an additional child, the marital status, health status, or phone number of the individual 134A may change, etc. The integrator 116 may in embodiments serve to transmit this updated information to the various entities. Assume for example that the individual 134A obtains the asset 300 from entity 170A and informs said entity that the individual 134A has three children. As discussed, the entity 170A may store this information in its database 178A, and this information may also be stored in the beneficiary record 132A. Assume that the individual 134A subsequently visits entity 170B and informs said entity that the individual 134A has four children. The entity 170B may store this information in its database 178B and communicate this information to the structure 102. The structure 102, upon determining that the number of children of (or other information about) the individual 134A has changed, may update the individual record 132A to reflect this change. The integrator 116 may determine that this change should further be communicated to the entity 170A because the profile of the individual 134A in the entity database 178A may not have been updated. The integrator 116 may thus cause this updated profile to be communicated to the entity 170A so that the profile of the individual 134A in the entity database 178A may be updated as required. The integrator 116 may thus facilitate integration of the information provided by the individual to one entity (e.g., entity 170B) with other entities (e.g., entity 170A).

In embodiments, the error checker 122 may automatically check for errors that may exist in the various entity databases. It is not uncommon for one entity to mistype or otherwise incorrectly enter into its database (e.g., database 178A) information about an individual (e.g., individual 134A). Assume, for example, that database 178A associated with entity 170A indicates that the age of an individual is 20 years whereas database 178N associated with entity 170N indicates that the age of that same individual is 30 years. The error checker 122 may determine that this information likely contains an error and alert the entities 170A and 170N so that the profile 200 of this individual may be flagged until the individual's age is verified.

In the prior art, there is no standardized platform which the individual 134A may employ to communicate with more than one entity (e.g., with entities 170A, 170B, and 170N). The structure 102 may in embodiments be in data communication with the beneficiary computer 136 and allow the individual 134A to use same to communicate with multiple entities. More specifically, in an embodiment, the individual 134A may use the beneficiary application 144, and specifically the entity communications module 152, to receive communications from (and in embodiments, to send communications to) multiple entities. For example, each of entity 170A and 170B may be able to communicate to the individual 134A that the individual 134A is eligible to receive additional benefits. The communication may be in the form of an e-mail, a voice message, an SMS, etc. The entity communications module 152 of the beneficiary application 144 may, upon receipt of a message from an entity, alert the individual 134A that a communication from an entity has been received (e.g., where the beneficiary computer 136 is a smart phone, the phone may ring to alert the individual regarding the receipt of the communication).

The benefits locator 150 of the beneficiary application 144 may allow the individual 134A to search for benefits that may be obtainable by the individual 134A. For example, the individual 134A may be able to enter the types of benefits he seeks, and the benefits locator 150 may identify for the individual 134A the entities that currently provide such benefits.

In embodiments, the benefits log generator 148 may maintain a log of all the benefits the individual 134A has received from each of the entities 170A, 170B, and 170N. The beneficiary application 144 may thus maintain for the individual 134A a log that is continually updated (e.g., updated every day, every two days, etc.) to reflect the benefits the individual 134A has received from any entity.

The individual 134A may use the profile reviewer 146 to review his current profile 200 as stored in the beneficiary record 132A. If the individual determines that the profile 200 contains an error or otherwise needs to be updated, the individual may use the entity communications module 152 or other means to communicate this change to the structure 102.

Benefactors (e.g., benefactor 160) may desire to glean information about the use of their grants by the various entities. In the prior art, however, there is no universal system that compiles information about the use of the grants by the various entities. Thus, in the prior art, if a benefactor 160 made a grant to each of entity 170A and 170B, the benefactor 160 must separately communicate with each of these entities to determine how these entities have been employing these grants for the benefit of the individuals. The disclosure provides a mechanism for benefactors to glean an unprecedented level of information about the reach of the benefactor's grants across multiple entities.

Figure 4:
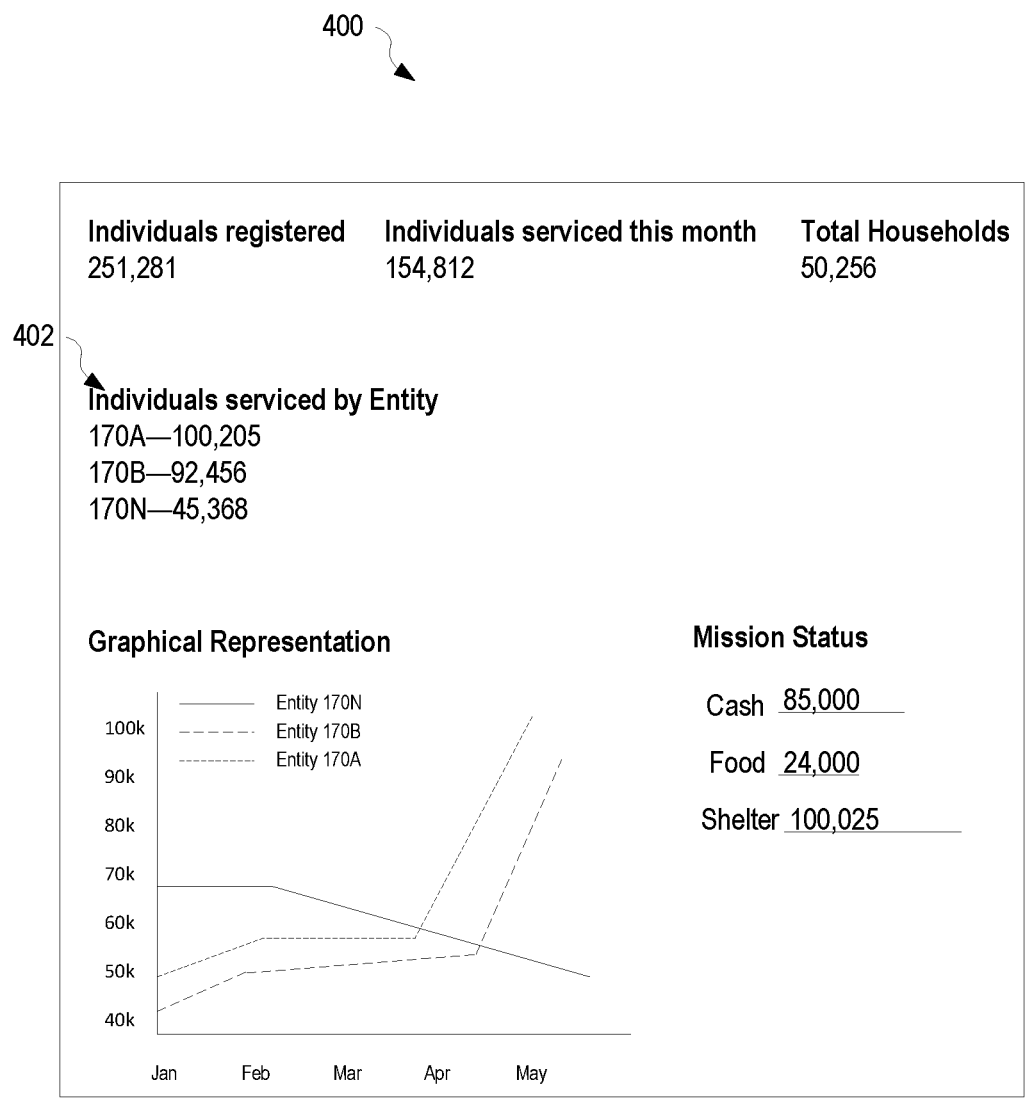
FIG. 4 shows an example dashboard which a benefactor may employ to obtain information about the provision of benefits by multiple entities.

Specifically, the benefactor application 168 may allow the benefactor 160 to use the benefactor application 168 to access the reporter 124 of the enrollment engine to, e.g., generate a benefactor dashboard 400 (FIG. 4). More specifically, in an embodiment, the compiler 126 may compile anonymized data (i.e., data devoid of identifying individual information) that outlines how the grants made by the benefactor 160 are being used by the various entities, and the dashboard generator 128 may generate the dashboard 400 that presents this information 402 to the benefactor 160 for review on the benefactor computer 162. As can be seen in FIG. 4, the example dashboard 400 may include lists, graphs, etc. that outline relevant information 402 for the benefactor 160. In embodiments, the benefactor 160 may be able to customize the dashboard 400 based on his or her preferences.

Figure 5:
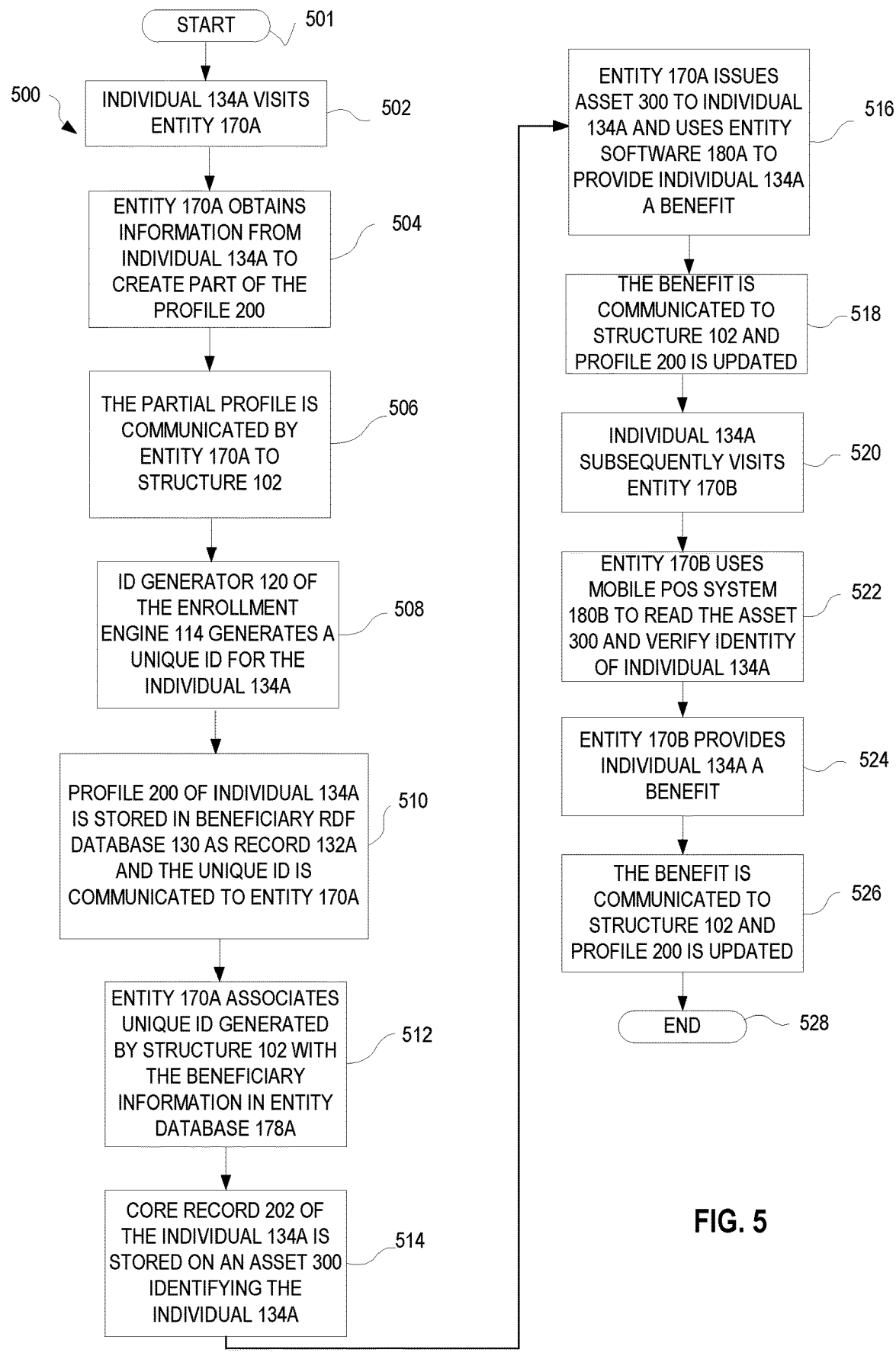
FIG. 5 shows a flowchart illustrating an example method of using the system of FIG. 1 to securely identify an individual across multiple entities.

FIG. 5 illustrates an example method 500 for using the system 100 to securely identify the individual 134A across multiple entities. For illustrative purposes, the method 500 details a situation where the individual 134A has not previously registered with any entity.

The method may begin at step 501. At step 502, individual 134A visits entity 170A to obtain a benefit. At step 504, the entity 170A obtains information from the individual 134A to create part of the profile 200. For example, the entity 170A may obtain the name, date of birth, marital status, mobile phone number, etc. of the individual 134A to create part of the beneficiary profile 200. At step 506, the entity 170A may communicate the partial profile to the structure 102 over the network 104C.

At step 508, the ID generator 120 may generate a unique ID for the individual 134A. At step 510, the profile 200 (together with the unique ID) may be stored in the beneficiary RDF database 130 as beneficiary record 132A, and the structure 102 may communicate the unique ID to the entity 170A. At step 512, the entity 170A may associate the unique ID with the individual 134A in its own database 178A.

At step 514, the mobile POS system 182A may be used by the entity 170A to store the core record 202 on the asset 300. At step 516, the entity 170A may issue the asset 300 to the individual 134A and use the entity software 180A to provide the individual 134A a benefit. For example, the entity 170A may give to the individual 134A an electronic voucher. At step 518, data outlining the benefit may be provided to the structure 102 so that the profile 200 (e.g., the extended record 204) may be updated in the beneficiary record 132A as appropriate.

At step 520, the individual 134A may visit another entity, e.g., entity 170B. At step 522, entity 170B may use the mobile point of sale system 182B to read the asset 300 and verify the identity of the individual 134A (e.g., the authenticator 118 of the structure 102 may verify that the asset 300 belongs to individual 134A; alternately, in an offline process, the entity 170A may ensure that the biometric data 302 of the individual 134A on the asset 300 matches the biometric data now provided by the individual 134A to the entity 170B).

At step 524, the entity 170B may provide the individual 134A a benefit (e.g., an electronic voucher). At step 526, the entity 170B may inform the structure 102 of this benefit so that the profile 200 (e.g., the extended record 204) of the individual 134A may be updated as needed. The method 500 may then end at step 528.

Thus, as has been described, the structure 102 may, among other things, allow an individual 134A to be securely identified across multiple disparate entities.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It should thus be noted that the matter contained in the above description or shown in the accompanying drawings is to be interpreted as illustrative and not in a limiting sense.

What is claimed is:

1. A server for secure individual identification across multiple disparate entities comprising:
   a network interface that communicates with a network;
   a memory including a resource description framework (RDF) database; and
   an electronic processor device in electrical communication with the memory, the electronic processor device is configured to:
   receive a profile of an individual from a first entity device of a plurality of entity devices via the network, wherein each entity device of the plurality of entity devices corresponds to one entity from a plurality of disparate entities in communication with a central authority, generate a unique identifier for the individual and communicate the unique identifier to the first entity device in response to receiving the profile of the individual, and store the profile of the individual and the unique identifier for the individual in the RDF database to enable other entity devices of the plurality of entity devices to access the profile of the individual from the RDF database based on the unique identifier through the central authority.

2. The server of claim 1, wherein, to communicate the unique identifier to the one or more of the plurality of entity devices, the electronic processor device is further configured to communicate the unique identifier to the first entity device.

3. The server of claim 2, wherein the electronic processor device is further configured to receive an indication of an identity-related interaction between the individual and the first entity device, and update the profile of the individual in the RDF database to include the identity-related interaction.

4. The server of claim 3, wherein the electronic processor device is further configured to record the identity-related interaction between the individual and the first entity device using a distributed ledger.

5. The server of claim 4, wherein the electronic processor device is further configured to receive a request from a benefactor to access one or more identity-related interactions that are recorded in the distributed ledger, and output information indicative of the one or more identity-related interactions to the benefactor.

6. The server of claim 1, wherein the electronic processor device is further configured to receive an indication of an identity-related interaction between the individual and a second entity device of the plurality of entity devices, and update the profile of the individual in the RDF database to include the identity-related interaction.

7. The server of claim 1, wherein the electronic processor device is further configured to track and manage consent of the individual for storing the profile of the individual and the unique identifier of the individual in the RDF database.

8. The server of claim 7, wherein the electronic processor device is further configured to receive the consent of the individual, and store the profile of the individual and the unique identifier for the individual in the RDF database in response to receiving the consent of the individual.

9. The server of claim 7, wherein the electronic processor device is further configured to receive a revocation of consent from the individual, and control the RDF database to delete all data associated with the individual in response to receiving the revocation of consent from the individual.

10. A system for secure individual identification across multiple disparate entities comprising:

a plurality of entity devices, each entity device of the plurality of entity devices corresponding to one entity from a plurality of disparate entities in communication with a central authority, the each entity device including an entity database, and a first entity device of the plurality of entity devices configured to:

obtain information from an individual, generate a profile based on the information from the individual, store the profile in the entity database of the first entity device, and output the profile to a network; and a server including:

a network interface that communicates with the network, a memory including a resource description framework (RDF) database, and an electronic processor device electrically connected to the memory, the electronic processor device configured to:

receive the profile of the individual from the first entity device, generate a unique identifier for the individual and communicate the unique identifier to the first entity device in response to receiving the profile of the individual, and store the profile of the individual and the unique identifier for the individual in the RDF database to enable other entity devices of the plurality of entity devices to access the profile of the individual from the RDF database based on the unique identifier through the central authority.

11. The system of claim 10, wherein, to communicate the unique identifier to the one or more of the plurality of entity devices, the electronic processor device is further configured to communicate the unique identifier to the first entity device, and wherein the first entity device is configured to associate the unique identifier with the profile of the individual in the entity database.

12. The server of claim 11, wherein the first entity device is configured to generate a core record that identifies the individual, issue an asset including the core record to the individual, and output an indication of a first identity-related interaction between the individual and the first entity device, and wherein the electronic processor device is further configured to:

receive the indication of the first identity-related interaction from the first entity device via the network, and update the profile of the individual in the RDF database to include the first identity-related interaction.

13. The system of claim 12, wherein the electronic processor device is further configured to record the first identity-related interaction using a distributed ledger.

14. The server of claim 13, wherein the electronic processor device is further configured to receive a request from a benefactor to access one or more identity-related interactions that are recorded in the distributed ledger, and output information indicative of the one or more identity-related interactions to the benefactor.

15. The server of claim 12, wherein a second entity device of the plurality of entity devices is configured to read the asset to verify an identity of the individual, and output an indication of a second identity-related interaction between the individual and the second entity device to the network, and wherein the electronic processor device is further configured to receive the indication of the second identity-related interaction from the second entity device, and update the profile of the individual in the RDF database to include the second identity-related interaction.

16. The system of claim 10, wherein the electronic processor device is further configured to track and manage consent of the individual for storing the profile of the individual and the unique identifier of the individual in the RDF database.

17. The system of claim 16, wherein, to track and manage the consent of the individual, the electronic processor device is further configured to
receive the consent of the individual, and
store the profile of the individual and the unique identifier for the individual in the RDF database in response to receiving the consent of the individual.

18. The system of claim 16, wherein, to track and manage the consent of the individual, the electronic processor device is further configured to
receive a revocation of consent from the individual, and
control the RDF database to delete all data associated with the individual in response to receiving the revocation of consent from the individual.

19. A non-transitory computer-readable storage medium comprising instructions that, when executed by an electronic processor device, causes the electronic processor device to perform a set of operations for secure individual identification across multiple disparate entities, the set of operations comprising:
receiving a profile of an individual from a first entity device of a plurality of entity devices, wherein each entity device of the plurality of entity devices corresponds to one entity from a plurality of disparate entities in communication with a central authority;
generating a unique identifier for the individual and communicate the unique identifier to the first entity device in response to receiving the profile of the individual; and
storing the profile of the individual and the unique identifier for the individual in a resource description framework (RDF) database to enable other entity devices of the plurality of entity devices to access the profile of the individual from the RDF database based on the unique identifier through the central authority.

20. The non-transitory computer-readable storage medium of claim 19, the set of operations further comprising:
receiving an indication of a first identity-related interaction between the individual and the first entity device;
updating the profile of the individual in the RDF database to include the first identity-related interaction;
receiving an indication of a second identity-related interaction between the individual and a second entity device of the plurality of entity devices; and
update the profile of the individual in the RDF database to include the second identity-related interaction.

\* \* \* \* \*